United States Patent [19]

Fiat

[11] Patent Number: 4,964,164
[45] Date of Patent: Oct. 16, 1990

[54] RSA COMPUTATION METHOD FOR EFFICIENT BATCH PROCESSING

[75] Inventor: Amos Fiat, Tel Aviv, Israel

[73] Assignee: Algorithmic Research, Ltd., Givitaim, Israel

[21] Appl. No.: 389,915

[22] Filed: Aug. 7, 1989

[51] Int. Cl.$^5$ .............................................. H04K 1/00
[52] U.S. Cl. ........................................ 380/30; 380/37; 380/28
[58] Field of Search ........................ 380/28, 37, 49, 30

[56] References Cited

U.S. PATENT DOCUMENTS

| | | | |
|---|---|---|---|
| 4,200,770 | 4/1980 | Hellman et al. | 380/49 X |
| 4,218,582 | 8/1980 | Hellman et al. | |
| 4,405,829 | 9/1983 | Rivest et al. | 380/30 |
| 4,424,414 | 1/1984 | Hellman et al. | 380/30 |
| 4,514,592 | 4/1985 | Miyaguchi | 380/30 |
| 4,567,600 | 1/1986 | Massey | 380/49 X |

*Primary Examiner*—Thomas H. Tarcza
*Assistant Examiner*—Tod Swann
*Attorney, Agent, or Firm*—David B. Newman, Jr. & Associates

[57] ABSTRACT

A computation for batch processing public key encryption method using a processor. The method batch processes an $e1^{th}$ root of a first message-data signal, M1, as $M1^{1/e1}$, and an $e2^{th}$ root of a second message-data signal, M2, where e1 and e2 are relatively prime, using the steps of computing an exponent product, e, by multiplying e1 times e2; computing a message product, M, wherein $M = M1^{(e/e1)} M2^{(e/e2)}$; computing a batch root, R, wherein $R = M^{1/e}$; computing the euclidean inverse, t, of e2 modulo e1; and computing $R^{e2*t}/(M1^{(e2*t-1)/e1} M2^t)$, thereby generating $M1^{(1/e1)}$. For a plurality of message-data signals, the method batch processes a plurality of message-data-signal roots as the e1, e2, ..., ek, roots for a plurality of message-data signals, M1, M2, ... Mk, respectively, where the ei and ej are pairwise relatively prime for $i \neq j$.

6 Claims, 1 Drawing Sheet

RSA COMPUTATION METHOD FOR EFFICIENT BATCH PROCESSING

BACKGROUND OF THE INVENTION

This invention relates to public key encryption techniques, and more particularly to a method for efficient batch processing RSA digital signatures and secret key computations.

RELATED PATENTS

This invention employs public-key-encryption concepts as disclosed in U.S. Pat. No. 4,200,770 entitled "Cryptographic Apparatus and Method", to *W. Diffie and M. E. Hellman*, Apr. 29, 1980; U.S. Pat. No. 4,405,829 entitled "Cryptographic Communications System and Method", to *R. Rivest, A. Shamir and L. Adleman*. Sep. 20, 1983; and, U.S. Pat. No. 4,424,414, entitled "Exponentiation Cryptographic Apparatus and Method", to *S. C. Pohlig and M. E. Hellman*, which are all expressly incorporated herein by reference.

DESCRIPTION OF THE PRIOR ART

Public key encryption is a concept which emerged in the 1970s. It centers on the idea of using different keys for encryption and decryption. The crucial point is that the decryption key cannot be deduced analytically from the encryption key. Each correspondent in the public key system has a unique pair of keys: an encryption key and a matching decryption key. Data encrypted with one particular person's encryption key can only be decrypted using the same person's decryption key.

Each person can therefore make his encryption key known freely to anyone. This is analogous to publishing one's telephone number in the telephone directory. If A wishes to send an encrypted message-data signal to B, he looks up B's published encryption key and encrypts his message-data signal using that key. Now the only person who can decrypt the enciphered message-data signal is B, using his secret decryption key. Not even A can decrypt the enciphered message-data signal, despite the fact that A encrypted it.

Public key encryption overcomes the communications problems of symmetric encryption algorithms for one main reason: while there is secret key information (each person's decryption key is secret), none of it need ever change hands. The only information which does need to be exchanged can be exchanged without any secrecy at all.

Various different algorithms for public key encryption have been proposed, most of which have been found to be flawed mathematically in some way. The single one to emerge which is generally acceptable is the RSA algorithm invented by Rivest, Shamir and Adleman, supra, and published in 1978.

RSA uses unique "keypairs" (pairs of numbers) for encryption and decryption. Each user of an RSA based system has his own pair, consisting of a freely publicized encryption key known as e, and a strictly private decryption key referred to as d. The algorithm also uses a modulus n.

Encryption and decryption comprise an exponentiation operation. If the plain text is represented as a message-data signal, x, then RSA encryption is the operation $y = x^e$ module n which produces a ciphertext represented as an enciphered-message-data signal, y.

Decryption is the operation $$x = y^d \text{ modulo } n$$

which restores x from y. The encryption process can be viewed as transforming the message-data signal to the enciphered-message-data signal by raising the message-data signal, x, to the eth power modulo n. The decryption process can be viewed as transforming the enciphered-message-data signal to the message-data signal by taking the eth root of the enciphered-message-data signal, y, modulo n. The security of this encryption relies upon the difficulty of calculating d from e and n. The correct choice of e, d and n is essential to the RSA algorithm. The modulus n is a product of two primes, p and q. See Rivest, Shamir and Adelman, supra.

The RSA algorithm can be used with numbers of any size, provided that they are chosen correctly. The larger n is, the harder the encryption is to crack. A commonly accepted standard is to use 512-bit numbers, which are equivalent to decimal numbers with approximately 150 digits. Cracking a 512-bit RSA would typically take tens of thousands of years on the most powerful computers currently available.

While encrypting a message-data signal with RSA guarantees that only the recipient will be able to decrypt it, it does not tell the recipient anything about the identify of the sender; anyone who knows the published encryption key could have encrypted the message-data signal. There is often a need to guarantee both the identity of the sender of a message-data signal and the contents of the message-data signal. A typical example might be instructions given to a bank to transfer money from one account to another: the bank needs to know for certain that the instructions have come from an authorized person and that the details of the payment have not been tampered.

The RSA algorithm provides an elegant means for fulfilling these requirements, by using the RSA algorithm as digital signature exponents. The sender of a signature represented as a signed-message-data signal can sign his signature using his own secret key, which is normally the decryption key. The signing of a signature using one's own secret key can be viewed as taking the eth root of a signature, modulo n. Anyone can verify the signed-message-data signal using the sender's published key, e. The verification of the signature represented as a verified-message-data signal can be viewed as raising the signed-message-data signal to the eth power, modulo n. If this verification produces the correct verified-message-data signal, then the signed-message-data signal can only have come from the appropriate sender, and thus both its contents and origin have been authenticated. Note, however, that the verification no longer offers protection against disclosure of contents, as anyone can verify the signed-message-data signal using the public key exponent.

OBJECTS AND SUMMARY OF THE INVENTION

An object of the present invention is to provide a method for efficiently computing digital signatures in a batch mode.

Another object of the present invention is to provide a method for efficiently transforming enciphered-message-data signals and generating signed-message-data signals in a batch mode.

According to the present invention, as embodied and broadly described herein, a computation method using a processor, for batch processing an $e1^{th}$ root of a first message-data signal, M1, as $M1^{1/e1}$, and an $e2^{th}$ root of a second message-data signal, M2, as $M2^{1/e2}$, where e1 and e2 are relatively prime, is provided comprising the steps of computing an exponent product, e, by multiplying e1 times e2; computing a message product, M, wherein $M = M1^{(e/e1)} M2^{(e/e2)}$; computing a batch product root, R, wherein $R = M^{1/e}$; computing the euclidean inverse, t, of e2 modulo e1; and computing $R^{e2*t}/(M1^{((e2*t-1)/e1)} * M2^t)$, thereby generating $M1^{(1/e1)}$. The present invention can be extended to batch processing a plurality of message-data-signal roots as the e1, e2, ..., ek, roots for a plurality of message-data signals, M1, M2, ... Mk, respectively, where the ei and ej are pairwise relatively prime for $i \neq j$.

Additional objects and advantages of the invention will be set forth in part in the description which follows, and in part will be obvious from the description, or may be learned by practice of the invention.

DETAILED DESCRIPTION OF THE PREFERRED EMBODIMENTS

Figure 1:
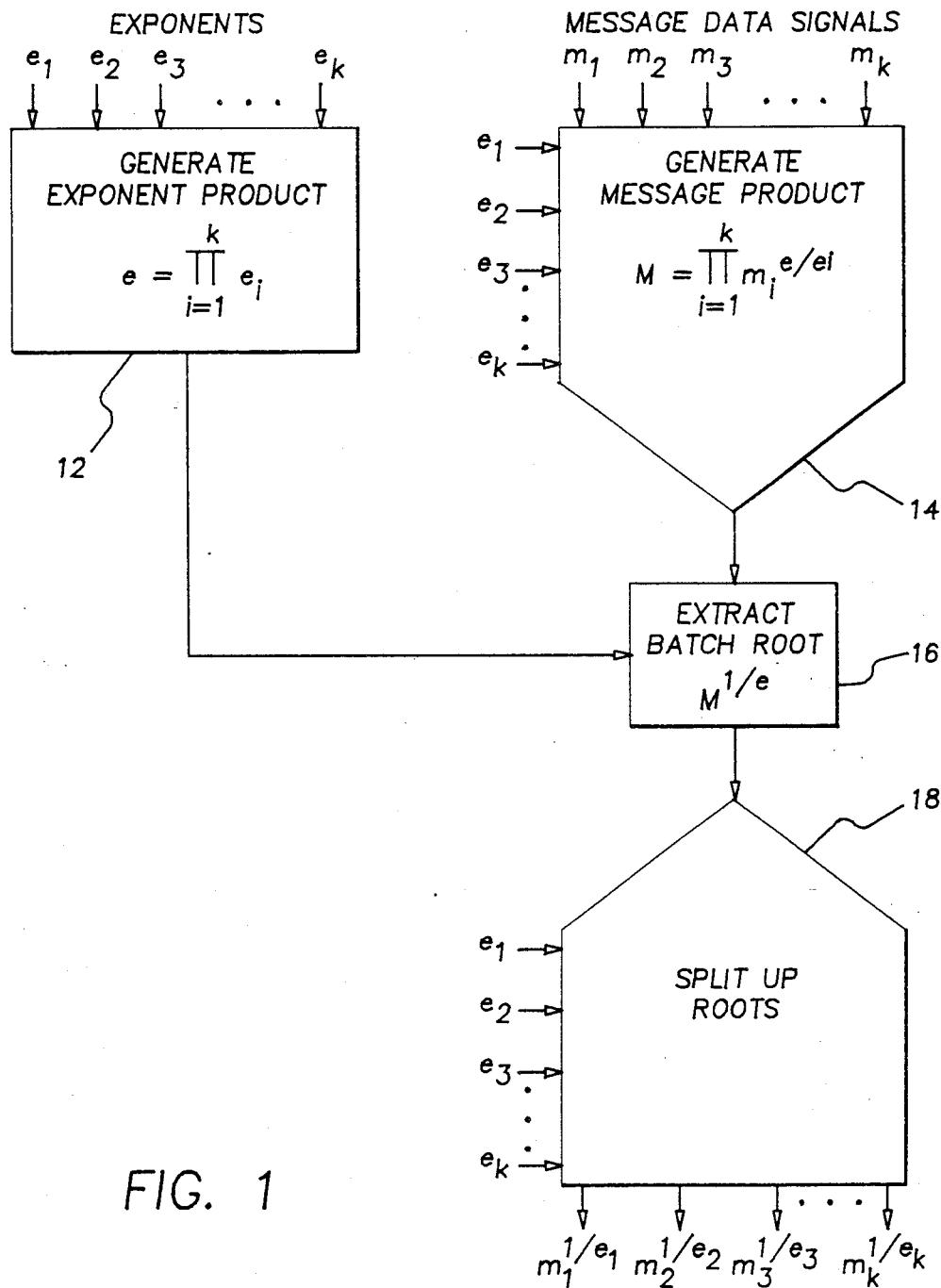
FIG. 1 is a flow diagram of the method of the present invention.

Reference will now be made to the present preferred embodiments of the invention.

The Rivest-Shamir-Adleman (RSA) scheme, supra, when viewed as a digital signature scheme is expensive to use on a large central computer. A full exponentiation is required for generating every digital signature.

The present invention provides a modification to the RSA method that allows far more efficient processing when the digital signatures are to be generated in a batch mode. That is, when several digital signatures are to be generated at once.

The RSA method normally is used with one signature-verification exponent or public-encryption exponent, e, and one matching and secret-signature exponent or decryption exponent, d, respectively. All arithmetic is performed modulo a publicly known composite number n whose prime factors, p and q, are kept secret.

To sign a message-data signal M, one extracts the e'th root of M by raising M to the d'th power. When using the RSA scheme for several documents needing the identical signature, one must activate the scheme for each and every signature, so that a person wishing to use the scheme for several documents, or a central computer having to analyze many signatures, will have to use up long and expensive computer time. The present invention provides a method for using the RSA scheme for simultaneously signing in parallel, or analyzing in parallel the same signature, by using the exponential formula one time.

Using the RSA scheme, the method of decrypting a enciphered message-data signal which represents a message, and the method of signing a message-data signal which represents a signature, are the same—taking the eth root of the enciphered-message-data signal as the message data signal, respectively.

The method of encrypting a message-data signal which represents a message, and the method of verifying a signed-message-data signal which represents a signature are the same—raising the message-data signal and the signed-message-data signal to the eth power, respectively.

The method of the present invention is described and claimed herein with reference to a message-data signal and enciphered-message-data signal. These terms also are meant to include a signed-message-data signal and a verified-message-data signal, respectively.

Usually, the exponent, e, is chosen to be a small prime, say 3 or 5.

It is suggested to have a variant where the digital signature is considered valid when the encryption exponents is either 3 or 5 or 7 or 11 or any other small prime.

Consider the case of two message-data signals, M1 and M2. In the RSA scheme one would have to compute a first message-data-signal root $M1^{(\frac{1}{3})}$ modulo n and a second message-data-signal root $M2^{(\frac{1}{5})}$ modulo n as two independent operations.

If one allows the roots to be either the 3rd root or the 5th root, then, according to the present invention, one could compute the first message-data-signal root as the 3rd root of M1 and the second message-data-signal root as the 5th root of M2 by performing only one full scale exponentiation:

Generate 14 a message product $M = M1^5 * M2^3$ and compute a batch root, $R = M^{(1/15)}$, which is one full scale exponentiation.

Note that 5 and 3 are relatively prime, let $t = 5^{-1}$ (mod 3). I.e., $t = 2$ as $5*2$ mod $3 = 10$ mod $3 = 1$.

To extract a first message-data-signal root $M1^{(\frac{1}{3})}$ mod n, we use the following algorithm as illustrated in FIG. 1:

Generate an exponent 12 product, e:

$$e = e1 * e2 = 3 * 5 = 15.$$

Generate the message product 14, M:

$$M = M1^{(e/e1)} * M2^{(e/e2)} \text{ (mod n)} = M1^{(15/3)} * M2^{(15/5)} \text{ (mod n)} = M1^5 * M2^3 \text{ (mod n)}.$$

Generate the batch root 16, R:

$$R = M^{(1/e)} \text{(mod n)} = M^{(1/15)} \text{ (mod n)} = (M1^5 * M2^3)^{(1/15)(\text{mod } n)} = M1^{(\frac{1}{3})} * M2^{(1/5)} \text{ (mod n)}.$$

Now, our goal is to extract the first message-data-signal root $M1^{(\frac{1}{3})}$ modulo n from the batch root, R:

Let $t = 5^{(-1)}$ (mod 3) = 2.

Generate $R^{(e2*t)}/(M1^{((e2*t-1)/e1)} * M2^t)$ (mod n).

Note that $R^{(5*2)}/(M1^{((5*2-1)/3)} * M2^2)$ (mod n) =
 $R^{10}/(M1^3 * M2^2)$ (mod n) =
 $(M1^{(\frac{1}{3})} * M2^{(1/5)})^{10}/(M1^3 * M2^2)$ (mod n) =
 $M1^{(3 + \frac{1}{3})} * M2^2/(M1^3 * M2^2)$ (mod n) =
 $M1^{(\frac{1}{3})}$ (mod n).

Note that $R/(M1^{(\frac{1}{3})})$ (mod n) = $M2^{(1/5)}$ (mod n) so we have extracted 18 both the first message-data-signal root $M1^{(\frac{1}{3})}$ (mod n) and the second message-data-signal root $M2^{(1/5)}$ (mod n).

In general, the method uses a processor for batch processing the first message-data-signal root as an $e1^{th}$ root of a first message-data signal, M1, as $M1^{1/e1}$, and the second message-data-signal root as an $e2^{th}$ root of a second message-data signal, M2, as $M2^{1/e2}$. The numbers e1 and e2 are relatively prime. Using the processor, the method performs the steps of computing 12 an exponent product, e, by multiplying e1 times e2, and computing a message product, M, wherein $M = M1^{(e/e1)} M2^{(e/e2)}$. From M, the method computes 16 a batch root, R, wherein $R = M^{1/e}$. An euclidean inverse, t, of e2 modulo e1 is then computed. The first message-data-signal-root $M1^{(1/e1)}$ is extracted 18 from $R^{e2*t}/(M1^{((e2*t-1)/e1)}M2^t)$. The second message-data-signal root $M2^{(1/e2)}$ is extracted 18 from $R/(M1^{1/e1})$.

Given M1, M2, . . . , Mk, with respective encryption exponents e1, e2, . . . , ek, pairwise relatively prime, let the exponent product $e = e1*e2* \ldots *ek$. Our goal is to extract the message-data-signal roots $M1^{(1/e1)}$, $M2^{(1/e2)}$, . . . , $Mk^{(1/ek)}$ modulo the composite n. For simplicity we will assume that k is a power of two, it is a very trivial modification to generalize the algorithm for arbitrary k.

This compares very favorably with the prior art which would require $O(k*\log(n))$ multiplications. An optimal batch size of $k = \log(N)/\log\log(n)$ messages, using the first k primes as exponents e1, ..., ek gives us $O((\log\log(n))^2)$ multiplications per root.

Method overview:

Step 1:

Compute a message product, M, wherein $M = M1^{(e/e1)}*M2^{(e/e2)}* \ldots *Mk^{(e/ek)}$. We do this in $O(\log(e)*\log(k))$ multiplications, much faster than the prior art which requires $O(\log(e)*k)$ multiplications.

To do this we run through the following algorithm:
The first phase:
Compute $M1^{e2}$, $M2^{e1}$, $M3^{e4}$, $M4^{e3}$, $M5^{e6}$, $M6^{e5}$, . . . $M(k-1)^{ek}$, $Mk^{e(k-1)}$. Generally, $M(2i-1)$ is raised to the power $e(2i)$ whereas $M(2i)$ is raised to the power of $e(2i-1)$.

Let $M(1 \ldots 2)$ equal $M1^{e2}* M2^{e1}$, $M(3 \ldots 4)$ equal $M3^{e4}*M4^{e3}$, etc. Generally, $M((2i-1) \ldots 2i) = M(2i-1)^{e(2i)}*M(2i)^{e(2i-1)}$.

The second phase:
Now we compute $M(1 \ldots 2)^{(e3*e4)}$, $M(3 \ldots 4)^{(e1*e2)}$, $M(5 \ldots 6)^{(e7*e8)}$, $M(7 \ldots 8)^{(e5*e6)}$, . . . , and compute $M(1 \ldots 4)$ as $M(1 \ldots 2)^{(e3*e4)}* M(3 \ldots 4)^{(e1*e2)}$, $M(5 \ldots 8)$ as $M(5 \ldots 6)^{(e7*e8)}*M(7 \ldots 8)^{(e5*e6)}$, etc.

Generally $M((4i-3) \ldots 4i)$ is equal to $M(4i-3 \ldots 4i-2)^{(e(4i-1)*e(4i))}*M(4i-1 \ldots 4i)^{(e(4i-e)*e(4i-2))}$.

We continue this process of generating larger and larger products $M(8i-7 \ldots 8i)$ from the previous products $M(8i-7 \ldots 8i-4)$ and $M(8i-3 \ldots 8i)$. The jth phase would generate products $M((2^j)*(i-1)+1 \ldots (2^j)*1)$.

At each phase we get products that are twice as long, thus we have $\log(k)$ phrases. The number of multiplications required in each phase is proportional to the overall length of the exponents in each phase, which is equal to $\log(e1*e2 \ldots *ek) - \log(e)$.

Step 2:

Extracting the e'th root of the product computed in step 1 generates a batch root, R, wherein $R = M1^{(1/e1)}*M2^{(1/e2)}* \ldots *Mk^{(1/ek)}$ This requires some constant times $\log(n)$ multiplications.

Step 3:

We now split the batch root R into its components. This also requires some constant times $\log(k)*\log(e)$ multiplications.

To describe this process we give a recursive algorithm. We show how to take the batch root R and generate a first and second subproduct, R1 and R2, respectively.

$$R1 = M1^{(1/e1)}*M2^{(1/e2)}* \ldots * M(k/2)^{e(k/2)}$$

and $$R2 = M(k/2+1)^{e(k/2+1)}*M(k/2+2)* \ldots * M(k)^{e(k)},$$

using only some constant times $\log(e)$ multiplications. This gives us a general solution as we can apply the algorithm recursively on the subroots. The depth of the recursion is $\log(k)$ since once we get to roots of length one we are done. Overall this gives $\log(e)*\log(k)$ multiplications.

Consider the exponent X defined by means of the Chinese remainder theorem:

X = 0 mod e1
X = 0 mod e2
. . .
X = 0 mod e(k/2)
X = 1 mod e(k/2+1)
X = 1 mod e(k/2+2)
. . .
X = 1 mod e(k)

X is well defined modulo e as the e(i) are pairwise relatively prime.

Let E1 denote the product of the first k/2 encryption exponents e1, e2, . . . , e(k/2). Let E2 denote e/E1.

Note that E1 divides X, $X = F1*E1$, for some integer F1. Similarly, E2 divides $X-1$, $X-1 = F2*E2$, for some integer F2.

Now, $R^X = (R1*R2)^X = R1^X*R2^X$.

$R1^X = R1^{(F1*E1)} = (R1^{E1})^{F1}$, $R2^X = R2^{(X-1)}*R2 = (R2^{E2})^{F2}*R2$.

However we have already computed $(R1^{E1})$ and $(R2^{E2})$, during the computation of message product M.

$R1^{E1} = M1^{(E1/e1)}*M2^{(E1/e2)}* \ldots * M(k/2)^{(E1/e(k/2))}$ which is computed as an intermediate result when computing M.

Similarly,
$R2^{E2} = M(k/2+1)^{(E2/e(k/2+1))}*M(k/2+2)^{(E2/e(k/2+2))}* \ldots * Mk^{(E2/ek)}$ Thus, to extract R1 and R2 we compute $R^X/((R1^{E1})^{F1}*(R2^{E2})^{F2}) = R2$, $R/R2 = R1$. The number of multiplications is proportional to $\log(X)+\log(F1)+\log(F2)$.

The foregoing algorithm can be used as a fast method for extracting multiple roots of multiple message-data signals, or multiple roots of the same message-data signal. Consider the following example:

Using the RSA algorithm, Let p = 53 and q = 61, where n = 53 * 61 = 3233. Letting d = 791, we get e = 71. To encipher the message-data signal M = RENAISSANCE, we break it into blocks of 4 digits each, where A = 00, B = 01, . . . , Z = 25, and blank = 26. The plain text message is

| M = | R E | N A | I S | S A | N C | E |
|---|---|---|---|---|---|---|
| = | 1704 | 1300 | 0818 | 1800 | 1302 | 0426. |

The first block of the plaintext message is enciphered as $1704^{71} = 3106$ (mod 3233). The entire plaintext message is enciphered as
C = 3106 0100 0931 2691 1984 2927.
The method of the present invention can be used to decipher the entire enciphered message-data signal, C, in one batch root. This batch product root has the advantage of a faster speed when compared with taking multiple roots, which in the example, would be six roots.

The present invention is claimed using the term message-data signal. By this term is meant, in the broadest sense, any type of signal to which the present invention can be applied. The message-data signal includes, but is not limited to, using a variable encryption/signature verification exponent in an RSA-like scheme; batch signature/encryption processing; any signature scheme/public key encryption scheme requiring only polylog(n) multiplications where n is the parameter; a fast method for extracting multiple roots from multiple messages; a fast method for extracting multiple roots from the same message; a fast method for computing a product; and a fast method for splitting up a product.

It will be apparent to those skilled in the art that various modifications can be made to the RSA method for efficient batch processing of the instant invention without departing from the spirit or scope of the invention, and it is intended that the present invention cover modifications and variations of the RSA method for efficient batch processing provided they come within the scope of the appended claims and their equivalents.

I claim:

1. A method, using a processor, for batch processing a first message-data-signal root as an $e1^{th}$ root of a first message-data signal, M1, as $M1^{1/e1}$, and a second message-data-signal root as an e2th root of a second message-data signal, M2, an $M2^{1/e2}$, where e1 and e2 are relatively prime, comprising the steps, using said processor, of:

computing an exponent product, e, by multiplying e1 times e2;

computing a message product, M, wherein $$M = M1^{(e/e1)} M2^{(e/e2)};$$

computing a batch root, R, wherein $$R = M^{1/e};$$

computing an euclidean inverse, t, of e2 modulo e1; and computing $$R^{e2*t}/(M1^{(e2*t-1)}M2^t)$$

thereby generating the first message-data-signal roots $M1^{(1e1)}$.

2. The method as set forth in claim 1 wherein the step of computing the message product, M, includes the step of computing $$M = M1^{(e/e1+e/e2)},$$

when the first message-data signal is identical to the second message-data signal, M1=M2.

3. A method, using a processor, for batch processing a plurality of message-data-signal roots as the e1, e2, ..., ek, roots for a plurality of message-data signals, M1, M2, ... Mk, respectively, where the ei and ej are pairwise relatively prime for i≠j, comprising the steps, using said processor, of:

computing an exponent product, e, by multiplying e1 * e2 * ... * ek;

computing a message product, M, wherein $$M = M1^{(e/e1)} M2^{(e/e2)} * \ldots * Mk^{(e/ek)};$$

computing a batch root, R, wherein $$R = M^{1/e};$$

splitting the batch root, R, into subproducts; and extracting the message-data-signal roots as the e1, e2, ..., ek roots of the message-data signals, M1, M2, ..., Mk, from said subproducts.

4. A method, using a processor, for batch processing a plurality of roots, e1, e2, ..., en, for a single message-data signal, M1, where the roots ei and ej are pairwise relatively prime for i≠j, comprising the steps, using said processor, of:

computing an exponent product, e, by multiplying e1 * e2 * ... * ek;

computing a message product, M, wherein $$M = M1^{(e/e1+e/e2+ \ldots +e/ek)};$$

computing a batch root, R, wherein $$R = M^{1/e};$$

splitting the batch product root, R, into subproducts; and extracting the roots of the message-data signal, M1, from said subproducts.

5. An apparatus for batch processing a plurality of message-data-signal roots as the e1, e2, ..., ek, roots for a plurality of message-data signals, M1, M2, ... Mk, respectively, where the ei and ej are pairwise relatively prime for i=j, comprising:

exponent means responsive to the e1, e2, ..., ek, roots for computing an exponent product, e, by multiplying e1 * e2 * ... * ek;

message means responsive to the message-data signals, M1, M2, ... Mk, for computing a message product, M, wherein $$M = M1^{(e/e1)} M2^{(e/e2)} * \ldots * Mk^{(e/ek)};$$

means coupled to said exponent means and said message means for extracting a batch root, R, wherein $$R = M^{1/e}; \text{ and}$$

means coupled to said extracting means for splitting the batch root, R, into subproducts and extracting the message-data signal roots as the e1, e2, ..., ek roots of the message-data signals, M1, M2, ..., Mk, from said subproducts.

6. An apparatus for batch processing a plurality of roots, e1, e2, ..., en, for a single message-data signal, M1, where the roots ei and ej are pairwise relatively prime for i=j, comprising:

exponent means responsive to the e1, e2, ..., roots for computing an exponent product, e, by multiplying e1 * e2 * ... * ek;

message means responsive to the message-data signal, M1, for computing a message product, M, wherein $$M = M1^{(e/e1+e/e2)+ \ldots +e/ek)};$$

means coupled to said exponent means and said message means for extracting a batch root, R, wherein $$R = M^{1/e}; \text{ and}$$

means coupled to said extracting means for splitting the batch root, R, into subproducts and extracting the data-signal roots as the e1, e2, ... ek roots of the message-data-signals, M1, M2, ... Mk, from said subproducts.

* * * * *